United States Patent [19]

Santa Maria et al.

[11] 3,926,097
[45] Dec. 16, 1975

[54] ROTARY DIE MECHANISM WITH VARIABLE SHEET VELOCITY MEANS FOR FORMING DIFFERENT SIZED BLANKS

[75] Inventors: Richard C. Santa Maria, Edison; Frank J. Anastasio, Paramus, both of N.J.

[73] Assignee: Bobst Champlain, Inc., Roseland, N.J.

[22] Filed: Aug. 13, 1974

[21] Appl. No.: 496,934

[52] U.S. Cl.............. 93/58.2 R; 83/300; 83/313; 83/336; 83/560; 93/58 R; 226/113
[51] Int. Cl.².... B26D 1/56; B23D 25/12; B31B 1/16
[58] Field of Search............ 83/110, 303, 313, 336, 83/495, 560, 300, 311; 226/113; 93/58 R, 93/58.2 R, 58.4, 45

[56] References Cited
UNITED STATES PATENTS

| | | | |
|---|---|---|---|
| 2,613,719 | 10/1952 | Conrad | 83/560 X |
| 3,379,351 | 4/1968 | Sarka | 226/113 X |
| 3,448,646 | 6/1969 | Bishop | 83/313 X |
| 3,485,131 | 12/1969 | Brolund | 83/560 |
| 3,667,354 | 6/1972 | Steinmetz | 83/313 X |

Primary Examiner—J. M. Meister
Assistant Examiner—Fred A. Silverberg

[57] ABSTRACT

Apparatus is provided for performing operations such as cutting and creasing on a continuous sheet material. The apparatus includes a first pair and a second pair of die carrying cylinders. The cylinders in each of the pairs are spaced to form a first and a second nip respectively therebetween. The cylinder pairs are physically independent such that the path of travel of the material as it moves from one nip to the other is not constrained by the size of the cylinders and may follow a substantially straight path as it moves from one nip to the other. Each of the cylinders in each pair is rotatable such that each pair periodically performs an operation along a substantial length of the material during respective operative intervals. Means in the form of a looper roll are provided for varying the velocity of the sheet material as it passes the first nip. The looper roll has a cyclical operation during one portion of which the material is caused to move at a constant velocity and during another portion of which the material is caused to move at a nonconstant velocity. The constant velocity portion of the looper roll cycle causes the velocity of the material to match the circumferential speed of the cylinders. This occurs during the operative interval of the first cylinder pair. As a result, the operation performed by the first cylinder pair may take place over a substantial length of the material.

26 Claims, 10 Drawing Figures

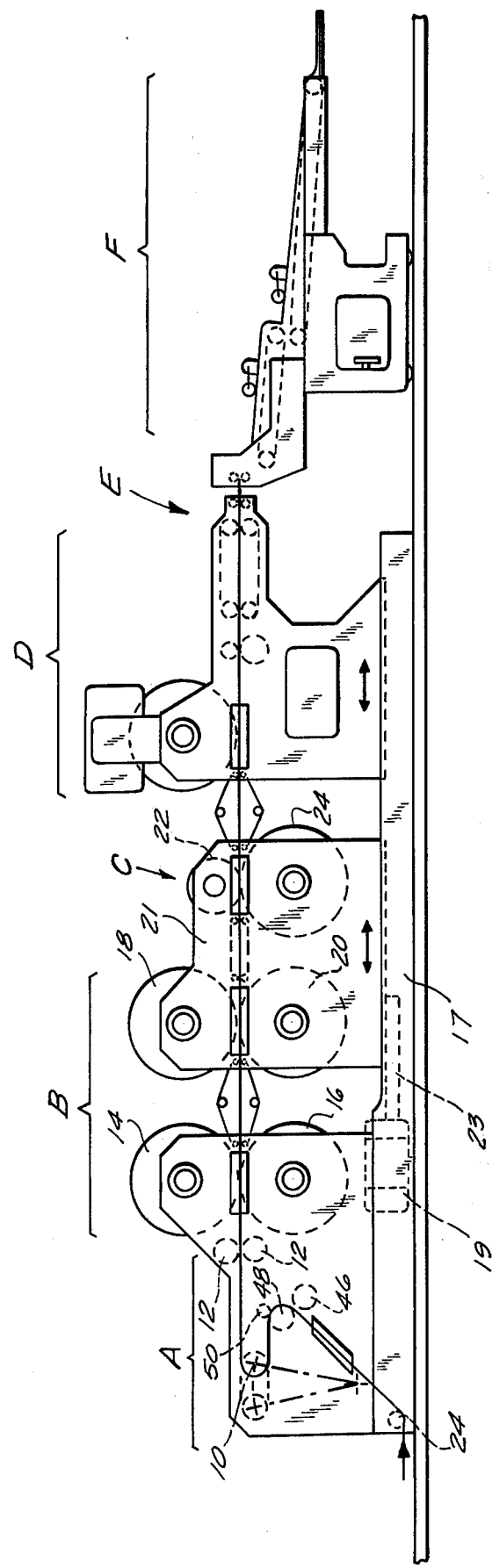
FIG. I

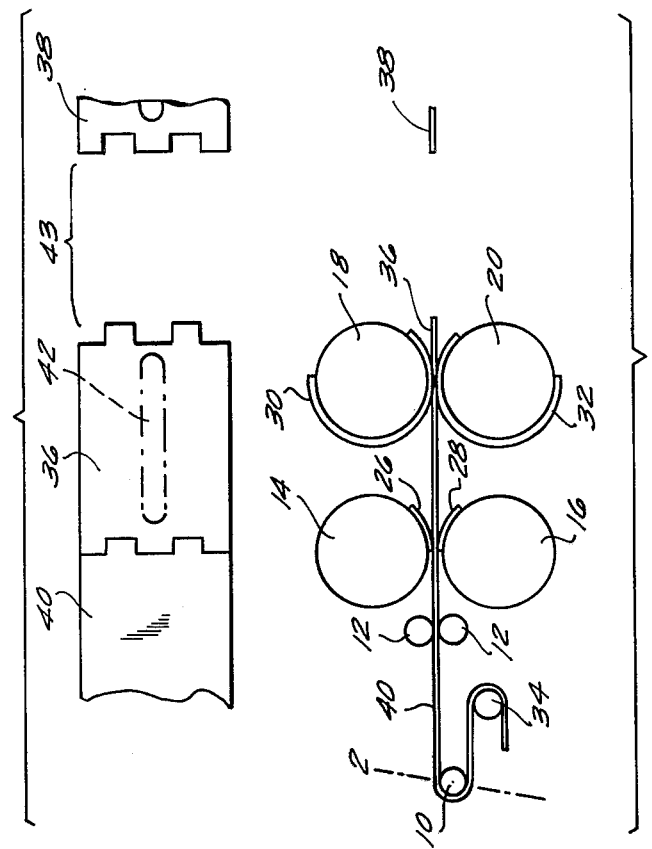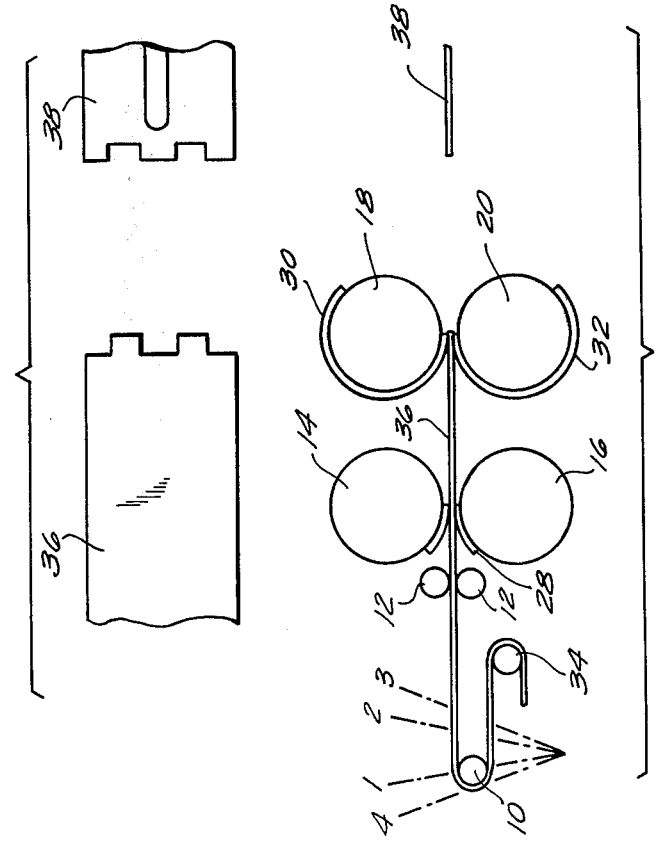

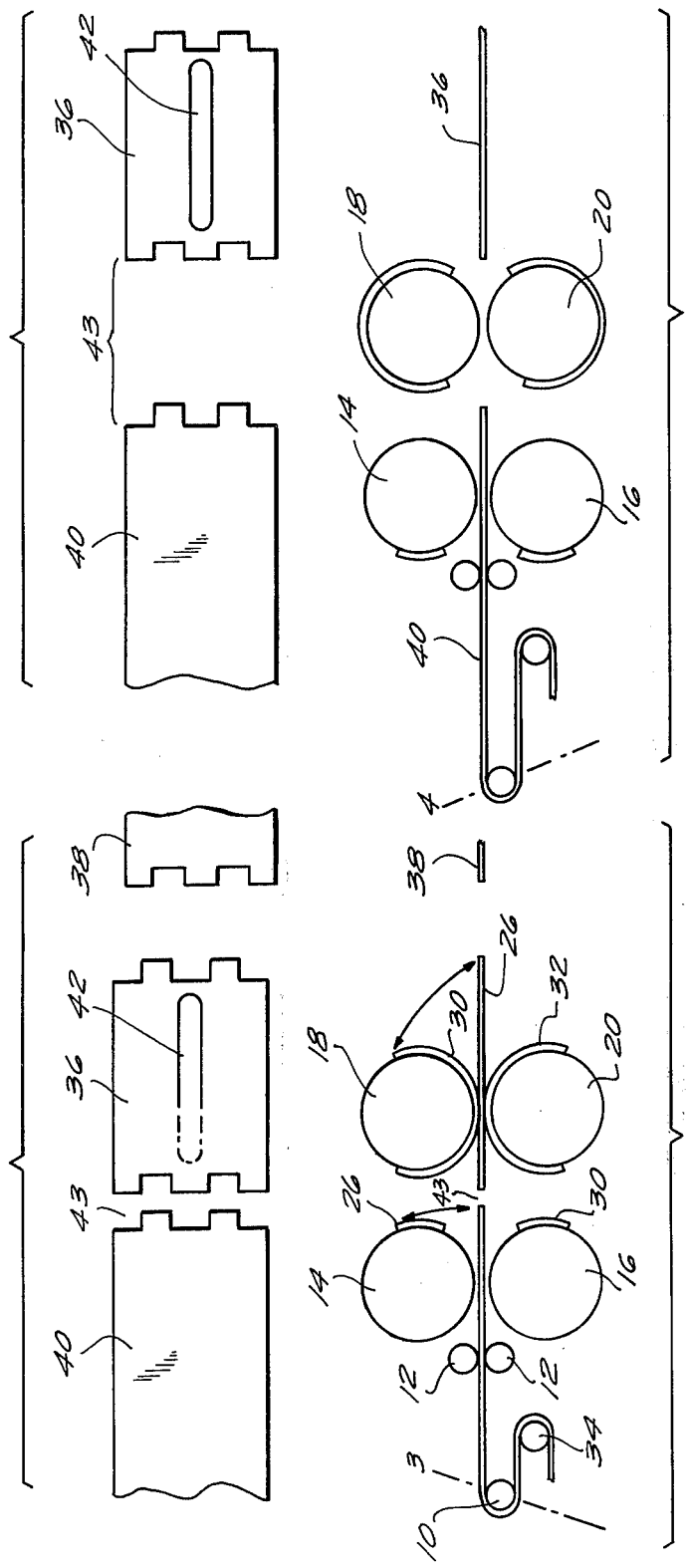

ROTARY DIE MECHANISM WITH VARIABLE SHEET VELOCITY MEANS FOR FORMING DIFFERENT SIZED BLANKS

The present invention relates to rotary die mechanisms and in particular to a rotary die mechanism employing a means for varying the velocity of the material as it passes through the operative portion of the apparatus.

Apparatus of the type herein described is utilized to perform one or more operations on a sheet-like material in web or sheet form as it is advanced through successive work stations. Although machines of this type are applicable for performing many different types of work operations on the sheet material, for example, cutting, creasing, scoring, bending, etc., such apparatus is often used in the blanking or forming of box or carton blanks according to a predetermined pattern.

The apparatus includes a plurality of rotatable cylinders arranged in pairs to form work stations. The cylinders carry material forming members which are adopted to engage the material and cooperate with corresponding forming members carried by adjacent cylinders to perform operations on material as it is advanced therebetween. The forming members must be accurately aligned so as to properly cooperate when the cylinders rotate. The material forming members are normally in the form of dies and are preferably composed of thin sheet steel plates which have been chemically milled to produce the necessary matched male-female contours. The plates are then wrapped around and clamped to their respective cylinders so that proper registration is maintained between the dies at all times. The cylinders carrying the mating dies are spaced a small distance apart such that a nip is formed therebetween. The material passes through the nip, and the operation is performed during that portion of the rotation of the cylinders where the dies mate.

Early systems designed to perform this function utilized a reciprocating punch type die cutter which included a pair of planar dies which were relatively movable toward and away from each other. The material was intermittently fed between the dies such that the material was stopped as the dies came together to perform the operation and then movement of the material was started again as the dies parted. Because the material had to be started and stopped as the operations were performed, this system proved to be too slow for modern production techniques.

The reciprocating die system was eventually improved by utilizing a continuous feed system and a movable roll, called a looper roll, positioned between the feed and the press. The looper roll served to take up the slack in the material during that portion of the cycle when the operation was being performed and the material movement had terminated. However, this system still could not develop the necessary speed required by modern industry.

Another approach to performing this function utilized rotary cylinders having the material forming members mounted thereon, as described above. This system had a master cylinder having two dies thereon. Two other cylinders were placed adjacent the master cylinder, each of which had a die thereon which mated with one of the dies on the master cylinder. The use of rotary die cylinders substantially increased the speed of the machine. However, the length of the carton blank was determined by that portion of the circumference of the master cylinder between the nips. Thus, the length of the carton blank could not be changed without making substantial alterations in the structure of the apparatus.

This system was improved by incorporating a looper roll in between the material feed means and the first nip. The looper roll was periodically shifted to change the speed of the material relative to the rotation of the cylinders and in particular to slow the speed in the material advancing through the nips when no work was being performed thereon at the work stations. Changing the advancing speed was effected due to the looper roll increasing the distance that the material had to move from the feed means to the first nip. This permitted a certain amount of versatility in the blank length without changing the circumference of the cylinder. However, the blank length could not be shorter than the circumference of the cylinder between the nips and still be retained on the cylinder. Thus, there was a lower limit as to how short the blank length could be when a master cylinder of a particular diameter was utilized. In addition, the winding and cylinder-constrained path of the material required by this system created design and handling problems. Moreover, since the looper roll continuously varied the velocity of the material, the only operation which could be performed at the first nip was one which was not performed over a substantial length of the material. For example, a simple transverse cut could be performed but not any operation which required the material speed to match the rotation speed of the cylinders for more than an instant. The reason for this was that since the velocity of the material was continuously changing, the material would tear if it was held in the first nip for any length of time.

It is, therefore, a prime object of the present invention to provide a rotary die mechanism wherein the length of the blank formed from the sheet material may be varied over a substantial range without changing the cylinder diameter.

It is another object of the present invention to provide a rotary die mechanism having varying velocity means wherein the cutting operation can take place along a substantial length of the material to provide cuts other than a simple transverse cut.

It is a further object of the present invention to provide a rotary die mechanism having a means for varying the velocity of the material which causes the material to move at constant velocity during certain portions of the cycle and at nonconstant velocity during other portions of the cycle.

It is still another object of the present invention to provide a rotary die mechanism wherein the path of travel of the material between the nips is independent of and not constrained by the cylinder size.

It is a still further object of the present invention to provide a rotary die mechanism wherein the means for varying the velocity of the material is located prior to the drive rolls and comprises a looper roll.

In accordance with the present invention apparatus is provided for performing operations, such as cutting and creasing, on a continuous sheet material in order to form carton blanks or the like. The apparatus includes a first pair and a second pair of die carrying cylinders. The cylinders in each of the pairs are spaced to form a first and a second nip, respectively, therebetween. The material, as it travels between the nips, follows a path, here shown as straight but which may be curved, which is independent of, but not constrained by, any of the cylinders themselves. Each of the cylinders in the pairs is rotatable such that each pair periodically performs an operation along a substantial length of the material during respective operative intervals. A pair of drive rolls is located prior to the first nip to feed material to the first pair of cylinders. Means for varying the velocity of the sheet material as it passes between the first nip is located prior to the drive rolls and takes the form of a looper roll. The looper roll has a cyclical operation, the duration of which is equal to the rotation time of the cylinders. The operation of the looper roll is divided into first and second portions. During the first portion the material is caused to move at a constant velocity. During the second portion the material is caused to move at a nonconstant velocity. The first portion of the looper roll cycle occurs throughout the operative interval of the first cylinder pair. During this portion the velocity of the material is caused to match the circumferential speed of the rotating cylinders thereby permitting the first cylinder pair to perform an operation over a substantial length of the material to achieve an irregularly shaped cut. The second portion of the looper roll cycle occurs subsequent to the operative interval of the first cylinder pair and comprises a deceleration period during which a gap is formed between the cut blank and the remainder of the material and an acceleration period during which the velocity of the material is again brought up to the cylinder speed such that the cycle can be repeated.

The cyclical action of the looper roll is produced by a cam controlled oscillating arm working in a one-to-one relationship to the cutting cylinders. Through proper movement of the looper roll the final portion of the material is caused to match velocity with the circumferential speed of the die cutting cylinder throughout the operative interval of the first cylinder pair during which time a blank is severed from the material having the irregular shape of the carton at its ends. At the same time, the leading edge of the blank is introduced into the nip of the second cylinder pair, which is running at the same speed as the material and the first cylinder, so that the blank is driven forward by the second cylinder pair and is die cut and creased in the process. This blank then continues through the scrap removal, slow down, and sheet stacking operations. The remaining material will slow down through the cyclic action of the looper so that a gap is formed between the blank and material.

The speed and the range of movement (referred to as the excursion) of the looper roll may be adjusted to accommodate carton blanks of various lengths. In addition, the cylinder pairs can be moved relative to each other to provide better control of the position of the severed sheet such that it is positively fed into the second cylinder pair.

To the accomplishment of the above, and to such other objects as may hereinafter appear, the present invention relates to a rotary die mechanism having means for varying the material velocity as defined in the appended claims and as described in the specification taken together with the accompanying drawings in which:

FIG. 1 is a side elevation view of the rotary die mechanism of the present invention;

FIGS. 2A and 2B are respectively a side elevation view of the apparatus in FIG. 1 with the looper roll in the first position and a top view thereof showing the material as it passes through this portion of the apparatus;

FIGS. 3A and 3B are views similar to FIGS. 2A and 2B respectively but wherein the looper roll is in the second position;

FIGS. 4A and 4B are similar to FIGS. 3A and 3B respectively but wherein the looper roll is in the third position;

FIGS. 5A and 5B are views similar to FIGS. 4A and 4B respectively but wherein the looper roll is in the fourth position.

Figure 6:
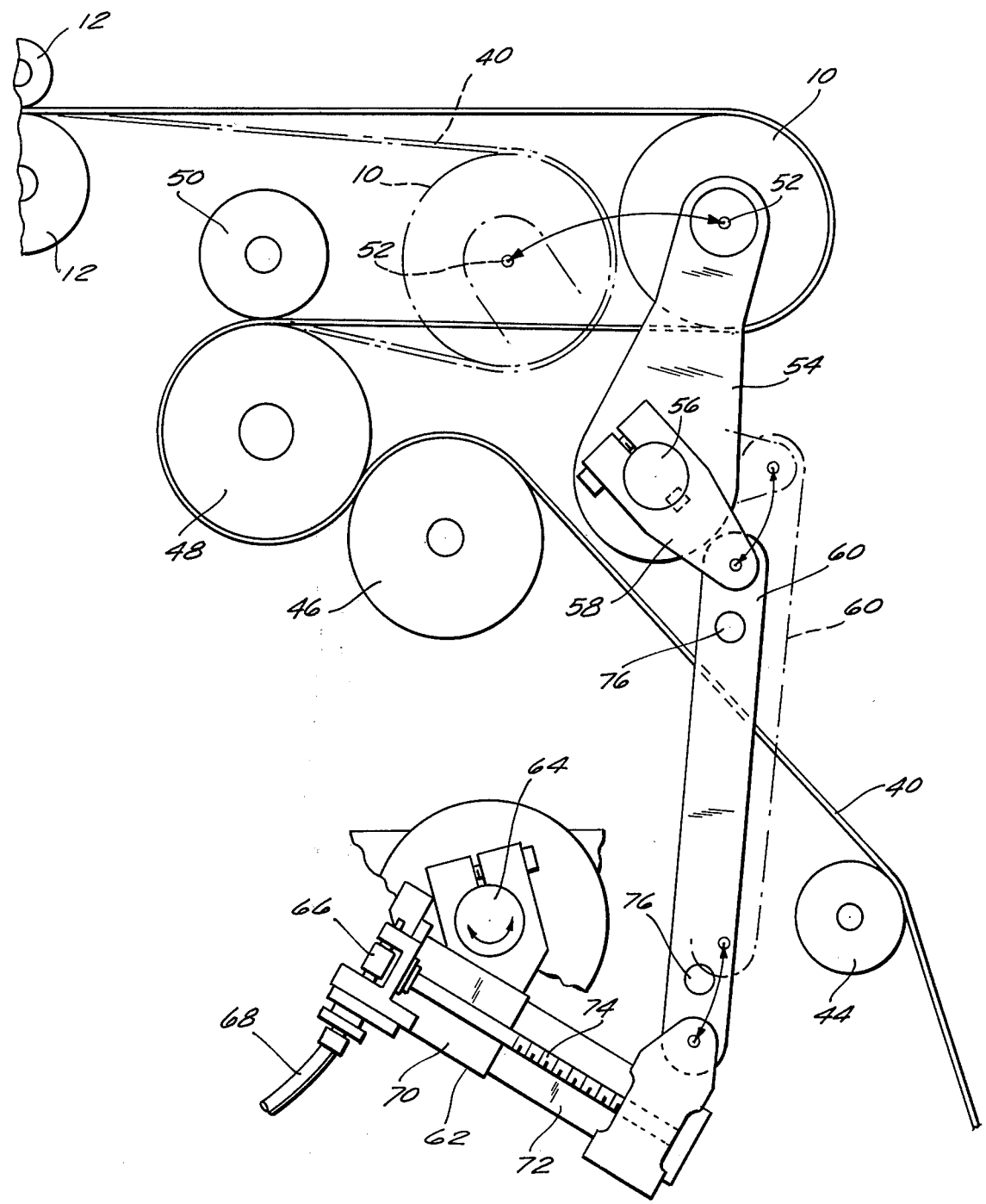
FIG. 6 is a side view of the mechanism showing the linkage which controls the movement of the looper roll including the adjustable level arm utilized to vary the looper excursion.

The present invention is particularly useful in the forming of box or carton blanks and therefore is herein disclosed in this context. It should be understood that the disclosure here is for illustrative purposes only and should not be construed to in any way limit the present invention to this particular function.

In addition, the reasons of simplicity, the present invention is described as operative on a sheet of material from which transverse rows containing a single box or carton blank are to be cut. However, it should be appreciated that the present invention could be and often is utilized to form transverse rows of blanks comprised of a plurality of blanks in side-by-side relationship.

Moreover, the present invention, when used to form carton blanks, can be utilized with material which is preprinted such that the printing will appear on the completed carton. However, the speed of the cylinder rotation must be set such that the printing appears on the appropriate portion of the carton.

As can be seen in FIG. 1, the continuous sheet material, such as paper when the machine is utilized to cut carton blanks, is fed into the machine through a feed section, generally designated A. Feed section A comprises a looper roll 10 and the appropriate mechanisms for moving the looper roll. In addition, a pair of drive rolls 12 are included in the feeding portion of the apparatus. Drive rolls 12 are motor driven at a constant velocity by a mechanism not shown. The blank forming portion of the apparatus, generally designated B, comprises a first pair of rotary cylinders 14, 16 and a second pair of rotary cylinders 18, 20. The cylinders in each cylinder pair are spaced from each other so as to form a nip therebetween. Since the cylinder pairs are physically independent, the path of travel of the material as it passes between the nips is not constrained by the size of any of the cylinders. Thus, the material preferably will travel in a substantially straight path as it moves from one nip to the other. However, other path configurations may be utilized if desired through the use of intermediate rolls. Cylinders in each pair carry a pair of mating dies, one of which is mounted on each cylinder. The dies are preferably thin sheet steel plates which have been chemically milled to produce the necessary matched male-female contours. The plates are then wrapped around and clamped to their respective cylinders so that the proper registration is maintained at all times. Each cylinder has the same diameter and contains a gap for the die clamps.

Preferably, the first set of cylinders 14 and 16 have interlocking dies thereon to perform the cutting operation. In a similar manner, the second pair of cylinders 18, 20 have interlocking dies thereon to perform the creasing operations and to form any cutout portions in the interior of the blank. As the material travels through portion B of the apparatus, the necessary cuts and creases are made therein in order to form the carton blank. The material is then transferred to a stripper station, generally designated C, wherein a pair of rollers 22, 24 remove the waste material from the blanks, including any cutout portions thereof. After waste removal the blanks are transferred to a collecting station, generally designated D, wherein each transverse row of blanks, which may comprise a single blank or several blanks in side-by-side relationship, are collected. After the rows of blanks are collected, they are transferred to a tab breaking mechanism generally designated E where the blanks in each transverse row, if there are more than one, are separated by cutting the tabs which hold them together. The individual blanks are then fed to a belt delivery section which places the blanks on skids or another conveyor belt for packaging.

The first pair of rollers 14, 16, the second pair of rollers 18, 20 and the collecting section D of the apparatus are all relatively movable such that the apparatus can accommodate runs of blanks having different lengths without the necessity for making any structural changes in the apparatus. Preferably, this is accomplished by utilizing a pair of guide rails 17 along which rolls 18, 20 are movable. The movement may be achieved by means of a motor 19 connected to the base 21 upon which cylinders 18, 20 are mounted by means of any suitable interconnection 23 such as a rack and pinion or chain drive. In addition, base 21 may be manually movable, if desired. Alternatively, the first cylinder pair may be moved relative to the remainder of the mechanism if this is mechanically more convenient. In a similar manner the collecting station D may also be movable or alternatively the appropriate intermediary rolls may be used when base 21 is moved in order to support the material as it travels between base 21 and station D. Such adjustability not only increases the range of different blank lengths which can be utilized without changing the diameter of the cylinders but also lessens the down time between runs of different blank lengths because of the ease of adjustment.

Each of the cylinders 14, 16, 18 and 20 are rotated at the same speed. Since the dies cover only a portion of the periphery of the cylinders, each cylinder pair has an operative interval and an inoperative interval. The operative interval occurs when the opposing dies mate, thereby performing an operation on the sheet material. The inoperative interval is that portion of the rotation of the cylinders wherein no operation is performed. During the inoperative interval the cylinders are so spaced that the material may freely pass therebetween.

The looper roll is cyclically moved to shorten or lengthen the effective path of the sheet material between the looper roll 10 and the first pair of die carrying cylinders 14, 16. The cycle of the looper roll 10 corresponds precisely with a single rotation of the cylinders. Thus, in the time it takes for the looper roll to complete one full cycle, a single rotation of each of the cylinders has taken place. Thus, there is a one-to-one cyclic relationship between the looper roll cycle and the rotation of the cylinders.

The loop of material produced by the action of the looper roll causes the material to match velocity with the circumferential speed of the first pair of cylinders throughout the operative interval of the first cylinder pair. During this period a blank is severed from the material. At the same time the leading edge of the blank is introduced into the nip of the second cylinder which is running at the same speed as the final portion of the material and the first cylinder pair so that the blank is driven forward by the second cylinder pair and is die cut and creased in the process. The material will then slow down through the cyclic action of the looper so that a gap is formed between the blank and the material.

The process is shown schematically in FIGS. 2 through 5. FIG. 2A shows cylinders 14 and 16 having mating dies 26, 28 respectively mounted thereon. In similar fashion, cylinders 18 and 20 have mating dies 30 and 32 respectively mounted thereon. Usually, the first pair of cylinders 14 and 16 will be utilized to perform the necessary cutting operations and the second set of cylinders 18 and 20 will be utilized to perform the necessary creasing operations and to form cutouts in the interior portions of the blank. The material is fed around a stationary roller 34, around looper roll 10, through drive rolls 12, and between the first cylinder pair 14, 16 and the second cylinder pair 18, 20. FIG. 2A shows the material at the start of the cycle. Looper roll 10 is at the first position and the leading portions of dies 26, 28 are mating. Further, the leading portions of dies 30 and 32 are also mating. Thus, each of the pairs of cylinders begins its operative interval at the same instant. This instant is synchronized with the movement of looper roll 10 such that looper roll 10 is in the first position. The leading edge of the material is introduced into the nip between the second cylinder pair 18, 20 at this instant. FIG. 2B shows a top view of the sheet material 36 and the previously cut carton blank 38. It should be noted that the leading edge of the material 36 has a zig-zag configuration due to the previous cut caused by the shape of the mating lands and valleys on dies 26 and 28. The first cylinder pair 14, 16 is operable over a substantial length of the sheet material thereby permitting the formation of this zig-zag pattern. If first cylinder pair 14 and 16 were not capable of functioning over a substantial length of the sheet material, the cut could only be a straight transverse cut.

FIGS. 3A and 3B show the material at the end of the operative interval of the first cylinder pair 14, 16. The looper roll 10 has advanced to the second position. Between the first and second positions, the looper roll is moved at a constant velocity so that the velocity of the material matches the cutting speeds. Thus, the material is fed to cylinders 14 and 16 at a constant velocity which matches the circumferential speed of the cylinders throughout the operative interval of these cylinders. The cut may be performed at any time during the constant velocity portion of the looper roll cycle. As long as the cutting operation is performed during the constant velocity portion of the looper roll cycle, the cutting operation may take place along a substantial length of the material, thus permitting the zig-zag type of cut shown in the drawings. Were the cut to take place when the material was being moved at a nonconstant velocity, no cut taking place along a substantial length of the material could be achieved because the material would tear or buckle as it passes between the rotating cylinders. Thus, the constant velocity portion of the looper roll cycle is synchronized with the operative interval of the first cylinder pair 14 and 16 to permit a cut along a substantial length of the material.

In FIG. 3A, the first pair of cylinders 14, 16 are shown at the end of their operative interval. Since the dies 30, 32 on cylinders 18, 20 are considerably larger than the dies 26, 28 on cylinders 14, 16, the operative interval of the second cylinder pair 18, 20 is still occurring when the operative interval of the first cylinder pair 14 and 16 terminates. As can be seen in FIG. 3B, the required zig-zag cut has been made in sheet material 36 thus forming a carton blank (now referred to as 36) out of sheet material and severing it from the remainder of the sheet material (now referred to as 40). In addition, there is an oval cutout 42 which is formed by the second pair of cylinders 18, 20. Part of this oval 42 is shown in dot-dash on the diagram to indicate where it will be cut and part of this oval is shown in solid lines to show that this portion has already been cut by dies 30, 32 on the second cylinder pair 18, 20.

FIG. 4A shows the looper roll in the third position. As the looper roll advances from the second to the third position, it is decelerating thereby slowing down the movement of material 40. The first cylinder pair 14, 16 is in the inoperative interval during this period. However, the second cylinder pair 18, 20 is still in its operative interval, and the material therein, which now forms blank 36, continues to move at the constant velocity. Since blank 36 is moving faster than material 40, a gap 43 is formed therebetween. In this manner, blank 36 is separated from the remainder of the material 40. In addition, the dies 30, 32 on second cylinder pair 18, 20 continue to form the remainder slot 42 in blank 36 as indicated in the drawing by the extension of the solid lines. The third position of looper roll 10 is its maximum forward position. At this point the direction of movement of looper roll 10 is reversed and it begins moving back towards its maximum rear position, the fourth position.

The fourth position of looper roll 10 is shown in FIG. 5A. As the looper roll 10 moves toward the fourth position, the gap 43 between blank 36 and the forward edge of the material 40 becomes greater until, as shown in FIG. 5A, the maximum gap 43 appears. When the looper roll 10 is in the fourth position, both the first cylinder pair 14, 16 and the second cylinder pair 18, 20 are in the inoperative intervals, i.e., the dies are positioned such that they do not mate. Carton blank 36 has been fully formed and is now moved towards the stripper station wherein the cutout portion 42 will be removed. Sheet material 40 is moving into position such that another row of blanks can be cut therefrom.

Looper roll 10 moves from the fourth position towards the original position shown in FIG. 2, and as it moves it accelerates such that the movement of sheet material 40 is once again varied to bring it up to the cylinder velocity. As the looper roll 10 reaches the first position, the operative interval of the first cylinder pair 14, 16 commences and the cycle repeats itself.

It should be appreciated that the length of the carton blank may be varied by varying the excursion of the looper roll 10 and by varying the distance between the nip formed by first cylinder pair 14, 16 and the nip formed by second cylinder pair 18, 20. Thus, blanks of relatively large lengths may be accommodated without changing the diameters of the cylinders. On the other hand, blanks having relatively small lengths can also be accommodated by shortening the excursion of looper roll 10 and moving the nips formed by the respective cylinder pairs closer together. Since the carton blank need not be in both nips simultaneously, as with prior art devices, blanks of extremely short lengths may be produced.

To change runs for a different cut length, the appropriate length dies must be affixed to the die cutting cylinders and the material speed geared properly to allow one revolution of the cutter per print repeat length or multiples thereof (assuming that the material is preprinted). The magnitude of the looper excursion is then adjusted to cause the proper speed-matching for cutting. The looper roll movement is adjusted so that the constant velocity portion thereof occurs throughout the operative interval of the first cylinder pair.

The motion of the looper roll 10 is established by a cam controlled oscillating arm as described in detail below. Although the cams which drive the oscillating arm and thus the looper roll are fixed, the looper roll linkage may be varied to adjust the excursion of the looper drum. The one-to-one cyclic relationship of the looper drum excursions to the revolutions of the cutting cylinders is always maintained. The gap which is formed between the sheets is a function of the cut length. As indicated above, a single cut sheet length may contain a multiplicity of carton lengths formed in a transverse row. Each of these carton blanks are simultaneously die cut with one revolution of the cylinders. This permits greater utilization of the circumference of the die carrying cylinders with small cartons.

The position of the second cylinder pair is adjustable in the direction of material travel so that its position can be adjusted relative to the cut length. An alternative to this method is to leave the cylinder positions fixed and move an intermediate sheet drive (not shown) traveling at cutting speeds so that it will propel the severed sheet properly to the second pair of cylinders.

FIG. 6 shows the looper 10 linkage. The material path is determined by a plurality of fixed rolls as well as by the position of looper roll 10. The material first travels over a fixed roll 44 and then to a fixed roll 46, around a fixed roll 48 between fixed rolls 48 and 50. The material then goes around looper roll 10 and is fed to drive rolls 12. Looper roll 10 is rotatably mounted on a shaft 52 which is mounted on a bracket 54. Bracket 54 is fixedly mounted on a shaft 56. A second bracket 58 is fixedly mounted on shaft 56 such that the movement of second bracket 58 moves shaft 56 and bracket 54 to move looper roll 10. Second bracket 58 is pivotally mounted to a first linkage arm 60 which in turn is pivotally mounted to a second linkage arm 62. Second arm 62 is fixedly mounted to a shaft 64 which in turn is operably connected to a cam control oscillating mechanism 64A (the details of which are not shown). The mechanism which produces the movement of shaft 64 is of conventional design and therefore need not be shown or described herein. Suffice it to say that this mechanism imparts an oscillatory movement to shaft 64 which in turn, by means of the linkage shown in FIG. 6, causes the looper roll 10 to move in its prescribed path.

Mounted on second arm 62 is a worm wheel 66, the position of which is remotely controlled by means of the rotation of a flexible adjusting cable 68. Second arm 62 has a first section 70 which is fixedly mounted to shaft 64 and upon which worm wheel 66 is mounted. Second arm 62 also has a movable section 72 to which first arm 60 is pivotally mounted. One end of a screw 74 is mounted to section 72 of second arm 62. This screw extends along section 70 and adjacent worm wheel 66 with which its threads mesh. The rotation of worm wheel 66 thus moves screw 74 and section 72 relative to section 70 thereby varying the effective length of second arm 62. The length of second arm 62 determines the excursion of the looper roll 10. Thus, in order to adjust the excursion of looper roll 10 one need only rotate wire 68. For larger changes in the amount of movement of looper roll 10, first arm 60 is provided with a plurality of apertures 76 (only two of which are shown) which can be utilized to shorten the effective length of first arm 60 by changing the operable connection between either bracket 58 and first arm 60 or section 72 and first arm 60, or both. Thus, the excursion of looper drum 10 can be easily adjusted to set the apparatus for runs of different cut lengths.

The apparatus of the present invention is capable of accommodating carton blanks of lengths which vary over a wide range. The apparatus can be easily adjusted for runs of different lengths with a minimum of down time. Moreover, because the sheet material is moved at a constant velocity during the operative interval of the first cylinder pair, the first cylinder pair can perform an operation over a substantial length of the sheet material. The apparatus is designed to operate at extremely high speeds, and the adjustability thereof significantly enhances the overall production capacity of the machine by substantially reducing the down time between production runs of different cut lengths.

A single preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

We claim:

1. Apparatus for performing operations on a continuous sheet material comprising a first pair and a second pair of die carrying cylinders, the cylinders in said pairs respectively being spaced to form a first and a second nip respectively therebetween, each of the cylinders in said cylinder pairs being rotatable such that each of said pairs periodically performs an operation along a substantial length of the material during respective operative intervals, means for varying the velocity of the sheet material as it passes between said first nip, said means having a cyclical operation divided into first and second portions wherein the material is caused to move at a constant velocity during said first portion and at a nonconstant velocity during said second portion, said first portion occurring during the operative interval of said first cylinder pair.

2. The apparatus of claim 1 wherein the second portion of the cycle of said means comprises an acceleration portion and a deceleration portion.

3. The apparatus of claim 2 wherein at least a part of said deceleration portion occurs during the operative portion of the cycle of said second cylinder pair.

4. The apparatus of claim 2 wherein said acceleration portion occurs during an interval other than the operative interval of both of said cylinder pairs.

5. The apparatus of claim 4 wherein said acceleration portion terminates at the commencement of the operative interval of said first cylinder pair.

6. The apparatus of claim 5 wherein the operative intervals of both cylinder pairs commence simultaneously.

7. The apparatus of claim 1 wherein said cylinder pairs are spaced from each other.

8. In the apparatus of claim 7, means operatively connected to said cylinder pairs to move them relative to one another, thereby to vary the distance between the nips.

9. The apparatus of claim 1 further comprising drive roll means adapted to be operatively connected to said sheet material, said drive roll means being located between said velocity varying means and said first cylinder pair.

10. The apparatus of claim 1 wherein said velocity varying means comprises a looper roll.

11. The apparatus of claim 10 wherein said velocity varying means further comprises oscillation means operatively connected to said looper roll.

12. The apparatus of claim 11 wherein said oscillation means is operatively connected to a shaft for imparting an oscillatory motion thereto, said shaft being operatively connected to said looper roll.

13. The apparatus of claim 12 further comprising a first lever mounted on said shaft for movement therewith, a second lever operatively connecting said first lever to said looper roll and means for varying the effective length of said first lever.

14. The apparatus of claim 1 wherein said first and said second nips are positioned such that the sheet material follows a substantially straight path from one of said nips to the other.

15. In the apparatus of claim 14, means operatively connected to said cylinder pairs to move them relative to one another, thereby to vary the distance between the nips.

16. The apparatus of claim 1 wherein said cylinder pairs are physically independent and wherein the path of travel of the material from one nip to the other is independent of and not constrained by said cylinders.

17. The apparatus of claim 8 wherein the second portion of the cycle of said means comprises an acceleration portion and a deceleration portion.

18. The apparatus of claim 17 wherein at least a part of said deceleration portion occurs during the operative portion of the cycle of said second cylinder pair.

19. The apparatus of claim 17 wherein said acceleration portion occurs during an interval other than the operative interval of both of said cylinder pairs.

20. The apparatus of claim 19 wherein said acceleration portion terminates at the commencement of the operative interval of said first cylinder pair.

21. The apparatus of claim 20 wherein the operative intervals of both cylinder pairs commence simultaneously.

22. The apparatus of claim 8 further comprising drive roll means adapted to be operatively connected to said sheet material, said drive roll means being located between said velocity varying means and said first cylinder pair.

23. The apparatus of claim 8 wherein said velocity varying means comprises a looper roll.

24. The apparatus of claim 23 wherein said velocity varying means further comprises oscillation means operatively connected to said looper roll.

25. The apparatus of claim 24 wherein said oscillation means is operatively connected to a shaft for imparting an oscillatory motion thereto.

26. The apparatus of claim 25 further comprising a first lever mounted on said shaft for movement therewith, a second lever operatively connecting said first lever to said looper roll and means for varying the effective length of said first lever.

* * * * *